United States Patent
Geier

(10) Patent No.: US 9,383,060 B2
(45) Date of Patent: Jul. 5, 2016

(54) SECURITY WALL RACK AND TELEVISION MOUNT COMBINATION

(71) Applicant: William F. Geier, White Stone, VA (US)

(72) Inventor: William F. Geier, White Stone, VA (US)

(73) Assignee: Synergy Global Supply, Inc.VA (US)

( * ) Notice: Subject to any disclaimer, the term of this patent is extended or adjusted under 35 U.S.C. 154(b) by 93 days.

(21) Appl. No.: 14/098,692

(22) Filed: Dec. 6, 2013

(65) Prior Publication Data

US 2014/0158647 A1   Jun. 12, 2014

Related U.S. Application Data

(60) Provisional application No. 61/734,108, filed on Dec. 6, 2012.

(51) Int. Cl.
| | | |
|---|---|---|
| A47H 1/10 | (2006.01) |
| F16M 13/02 | (2006.01) |
| F16M 11/04 | (2006.01) |
| F16M 11/08 | (2006.01) |
| F16M 11/20 | (2006.01) |

(52) U.S. Cl.
CPC ............. *F16M 13/02* (2013.01); *F16M 11/048* (2013.01); *F16M 11/08* (2013.01); *F16M 11/2014* (2013.01)

(58) Field of Classification Search
CPC combination set(s) only.
See application file for complete search history.

(56) References Cited

U.S. PATENT DOCUMENTS

| | | |
|---|---|---|
| 74,490 A | 2/1868 | Bidwell |
| 101,207 A | 3/1870 | Angar |
| 173,356 A | 2/1876 | Sloan |
| 417,722 A | 12/1889 | Hart |
| 676,450 A | 6/1901 | Schwartz |
| 1,042,062 A | 10/1912 | Weed |
| 1,094,279 A | 4/1914 | Wagner |
| 1,139,218 A | 5/1915 | Olm |
| 1,300,275 A | 4/1919 | Johnson |
| 1,459,688 A | 6/1923 | Parkinson |
| 1,941,932 A | 1/1934 | Deutsch |
| 2,518,886 A | 8/1950 | Halvorsen |
| 3,172,282 A | 3/1965 | Heckrotte |
| 3,343,386 A | 9/1967 | Hall |
| 3,444,712 A | 5/1969 | Greenwald |
| 3,494,159 A | 2/1970 | Greenwald |
| 3,659,442 A | 5/1972 | Cellini et al. |
| 3,837,191 A | 9/1974 | Soiderer |
| 3,885,586 A | 5/1975 | Tibbetts |
| 4,038,845 A | 8/1977 | Szlakman |
| 4,098,102 A | 7/1978 | Kalina |
| 4,237,755 A | 12/1980 | Gunnell, III |
| 4,254,967 A | 3/1981 | Scanlon |
| 4,289,001 A | 9/1981 | Corfield |
| 4,334,443 A | 6/1982 | Pearson |
| 4,455,898 A | 6/1984 | Marbourg, Jr. |
| 4,643,053 A | 2/1987 | Rhodes |
| 4,724,689 A | 2/1988 | Anchia |
| 5,363,976 A | 11/1994 | Kapka |

(Continued)

*Primary Examiner* — Monica Millner

(74) *Attorney, Agent, or Firm* — Thomas & Karceski, P.C.

(57) ABSTRACT

A security wall rack and television mount combination is described to deter or prevent unauthorized persons from gaining access to the back of a television or the wall mount that supports the television and to deter or prevent theft of a television. The wall mount includes security covers that are rotatably attached to the frame that cover the location where screws will secure the frame to a wall or other surface. The mount is rotatably attached to the frame and provides for the system to be locked in place in a nested way.

3 Claims, 9 Drawing Sheets

(56) References Cited

U.S. PATENT DOCUMENTS

| | | | |
|---|---|---|---|
| 5,400,993 A * | 3/1995 | Hamilton | F16M 11/00 248/279.1 |
| 5,449,260 A | 9/1995 | Whittle | |
| 5,572,889 A | 11/1996 | Ping-Hua | |
| 5,813,751 A | 9/1998 | Shaffer | |
| 6,008,452 A | 12/1999 | Lux, Jr. | |
| 6,089,396 A | 7/2000 | Pozek | |
| 6,102,348 A * | 8/2000 | O'Neill | A47B 81/061 248/289.11 |
| 6,402,109 B1 | 6/2002 | Dittmer | |
| 6,536,730 B1 | 3/2003 | Baer | |
| 6,880,792 B2 | 4/2005 | Muir | |
| 6,905,101 B1 * | 6/2005 | Dittmer | F16M 11/04 248/125.7 |
| 7,249,739 B2 | 7/2007 | Chueh et al. | |
| 7,273,203 B2 | 9/2007 | Carnevali | |
| 7,611,118 B2 | 11/2009 | O'Neill | |
| 7,669,443 B2 | 3/2010 | Varner | |
| 7,712,515 B2 | 5/2010 | Sulak et al. | |
| 7,793,903 B2 * | 9/2010 | Dittmer | F16M 11/048 248/276.1 |
| 7,866,621 B1 | 1/2011 | Walters | |
| 7,963,489 B2 * | 6/2011 | O'Keene | F16M 11/10 211/99 |
| 7,984,888 B2 * | 7/2011 | Park | F16M 11/10 248/274.1 |
| 8,087,268 B1 | 1/2012 | Pruitt | |
| 8,245,990 B2 * | 8/2012 | Huang | F16M 11/04 248/276.1 |
| 8,388,256 B2 | 3/2013 | Atkins et al. | |
| 8,403,273 B2 * | 3/2013 | Takamatsu | F16M 11/00 248/122.1 |
| 8,459,072 B2 | 6/2013 | Bisson et al. | |
| 8,746,635 B2 * | 6/2014 | Kim | F16M 11/10 248/133 |
| 8,827,226 B2 * | 9/2014 | Townsend | F16M 11/10 220/3.5 |
| 8,891,249 B2 * | 11/2014 | Stanek | F16M 11/10 248/276.1 |
| 8,910,804 B2 * | 12/2014 | Kim | F16M 11/045 211/87.01 |
| 8,958,200 B2 * | 2/2015 | Bremmon | F16M 11/10 248/201 |
| 2003/0013068 A1 | 1/2003 | Gittleman | |
| 2003/0201372 A1 * | 10/2003 | Dozier | F16M 11/10 248/286.1 |
| 2004/0251387 A1 * | 12/2004 | Kim | F16M 11/04 248/201 |
| 2005/0127253 A1 * | 6/2005 | Kim | B60R 11/0235 248/176.1 |
| 2005/0152102 A1 * | 7/2005 | Shin | F16M 11/10 361/679.29 |
| 2005/0258321 A1 * | 11/2005 | Worrall | F16M 11/046 248/201 |
| 2005/0274855 A1 * | 12/2005 | Shin | F16M 11/38 248/220.22 |
| 2006/0042429 A1 | 3/2006 | Kozak et al. | |
| 2006/0070903 A1 | 4/2006 | Chiang | |
| 2007/0068349 A1 | 3/2007 | Min | |
| 2007/0252056 A1 * | 11/2007 | Novin | F16M 11/04 248/205.1 |
| 2008/0054147 A1 * | 3/2008 | Muday | F16M 11/10 248/316.8 |
| 2008/0237430 A1 * | 10/2008 | Kakuta | F16M 13/00 248/398 |
| 2008/0253071 A1 * | 10/2008 | Stoelinga | F16M 11/04 361/679.06 |
| 2009/0050763 A1 * | 2/2009 | Dittmer | F16M 11/10 248/284.1 |
| 2009/0179128 A1 * | 7/2009 | Boberg | F16M 11/10 248/278.1 |
| 2010/0038501 A1 * | 2/2010 | Oh | F16M 11/10 248/201 |
| 2010/0091438 A1 * | 4/2010 | Dittmer | F16M 11/10 361/679.01 |
| 2010/0171013 A1 * | 7/2010 | Anderson | F16M 13/02 248/201 |
| 2010/0171014 A1 * | 7/2010 | Stemple | F16M 11/04 248/201 |
| 2010/0172072 A1 * | 7/2010 | Monaco | F16M 11/10 361/679.01 |
| 2010/0309615 A1 * | 12/2010 | Grey | F16M 11/10 361/679.01 |
| 2011/0024589 A1 * | 2/2011 | Lam | F16M 11/10 248/220.22 |
| 2011/0095150 A1 * | 4/2011 | Geier | F16B 41/005 248/220.22 |
| 2011/0163215 A1 * | 7/2011 | Walters | F16M 11/08 248/220.22 |
| 2011/0174944 A1 * | 7/2011 | Fredette | F16M 13/02 248/220.22 |
| 2011/0198460 A1 * | 8/2011 | Stifal | F16M 11/10 248/201 |
| 2011/0234926 A1 * | 9/2011 | Smith | F16M 11/10 348/836 |
| 2011/0248128 A1 * | 10/2011 | Oh | F16M 11/041 248/201 |

\* cited by examiner

SECURITY WALL RACK AND TELEVISION MOUNT COMBINATION

This application claims the benefit of U.S. Provisional Patent Application No. 61/734,108, filed on Dec. 6, 2012, and incorporated herein by reference.

The field of the invention is a television mounting system for vertical wall installation. The device is particularly important and most useful at locations where stealing of televisions occurs, i.e. the hospitality industry, public laundromats, and any other public areas where expensive televisions are located and little or no security is available. Specifically, the mount includes tamper-proof features to deter and prevent unauthorized dismounting of a television or the wall rack that supports it once it has been installed on a wall or flat surface location.

BACKGROUND

With recent technological advantages, flat screen televisions have become extremely popular. Not only are the pictures getting brighter and clearer, the television device itself is becoming a very thin, portable and lightweight object easily carried by one person. The portability and easy handling of the new televisions are mostly good for consumers. However, particularly in the hospitality industry, those televisions are becoming very easy to steal. Currently, there are numerous wall mount products that are available to fix a flat screen television onto a wall or television cabinet. Even if there are some security features such as hidden latches, many of these existing television mounts are able to be easily removed from the wall or surface where they are mounted. A thief is then able to carry away the expensive television relatively easily. Some television wall mounts on the market may have protection from having the television removed from the mount but often the wall rack component itself is subject to be stolen off the wall along with the television as it offers no means to 'hide' the mounting hardware used to install it.

SUMMARY

Accordingly, it is an object of the present invention to provide a flat screen television mounting system that is not only able to be securely fixed to a wall, but it is also able to deter or prevent any potential thief from easily dismounting a television from the wall mount and stealing it.

In one example, a security television wall rack comprises a wall frame. The wall frame includes a plurality of support legs, each having a proximal end and a distal end, and a middle section that is connected to the proximal end of each of the support legs. The support legs each have multiple holes therethrough and spaced along the length thereof. A corresponding plurality of security covers is each hingedly connected to the distal end of the corresponding plurality of support legs. When in a hinged closed position, the security covers are oriented over the holes in the respective support legs. The wall rack may comprise three support legs or four support legs. The wall rack may include four support legs and a middle section that form an H-shaped frame. In another example, a security wall rack and television mount combination includes a security wall rack as described above. A television mount comprises a mount plate and upper and lower arm supports, wherein the lower arm supports are rotatably connected on one end to the middle section of the wall rack and on their other ends rotatably connected to one end of the upper arm supports. The upper arm supports are rotatably connected on their other ends to the mount plate. The mount plate, therefore, has an extended position and a retracted position, wherein in the retracted position the upper and lower arm supports and the mount plate are nested adjacent the wall rack. The mount plate may further include a flange that extends from the back thereof and comprises an aperture therein. The middle section of the wall rack comprises a pin slidably mounted thereon, with the pin adjacent the mount plate flange aperture and adapted to slide into and out of the aperture, wherein the mount plate is locked in the retracted position when the pin is slidably received in the aperture.

DETAILED DESCRIPTION

Figure 1:
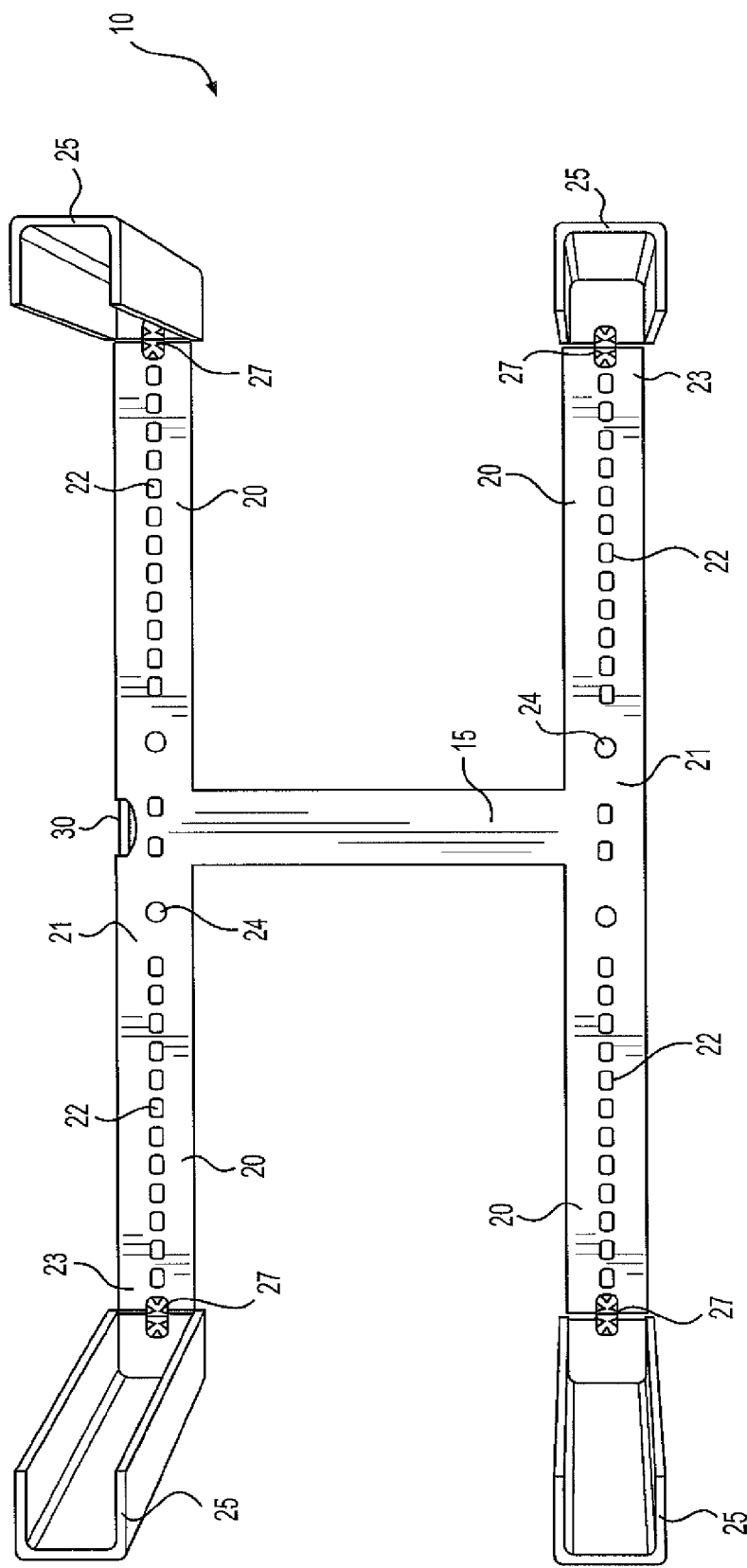
FIG. 1 is a top perspective view of a wall rack having security covers shown in the upward or open position.
Figure 2:
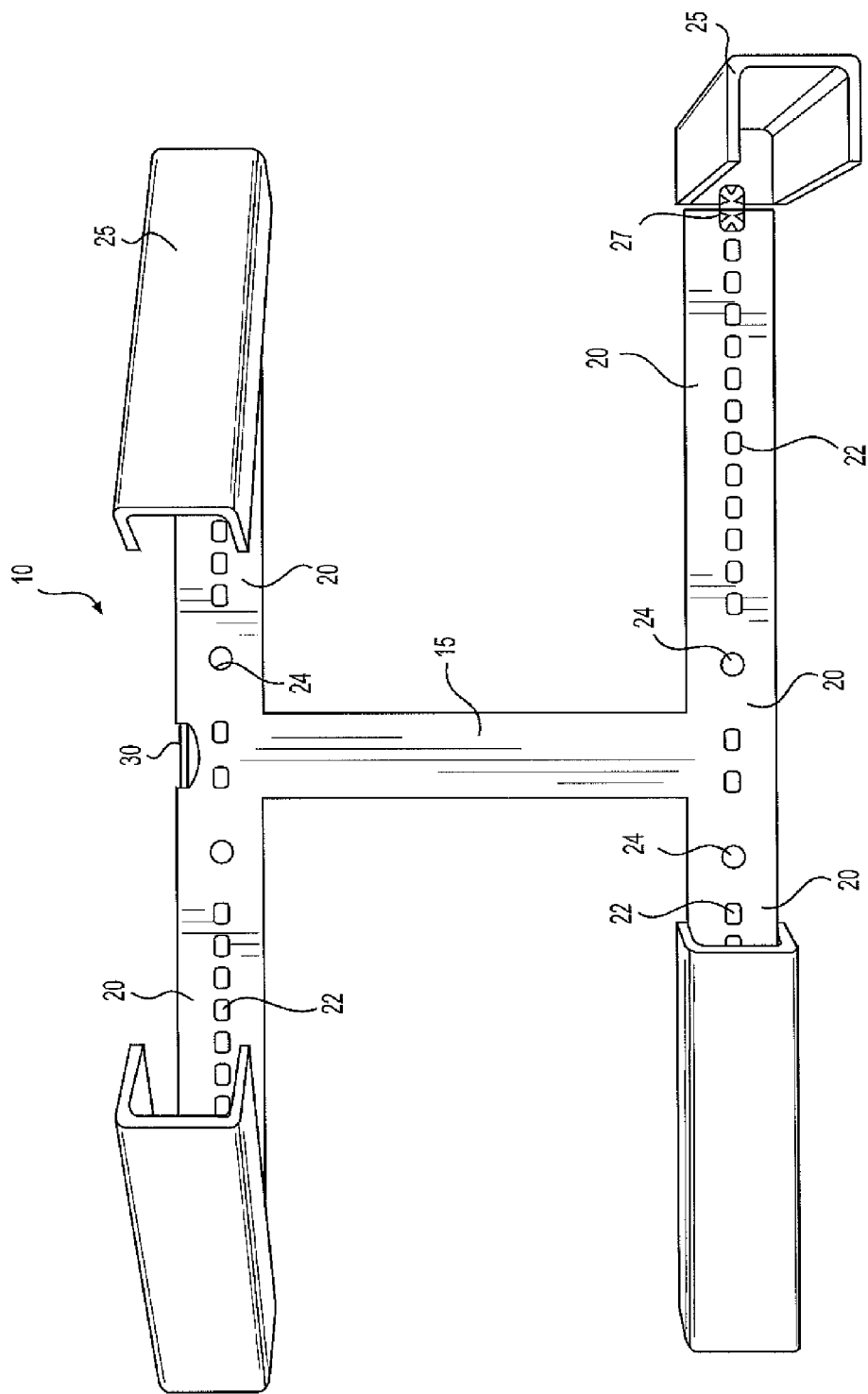
FIG. 2 is a top perspective view of a wall frame with the security covers shown in various stages of covering a portion of the frame that will receive the mounting hardware, screws, lag bolts, etc. and secure the unit to a wall.
Figure 3:
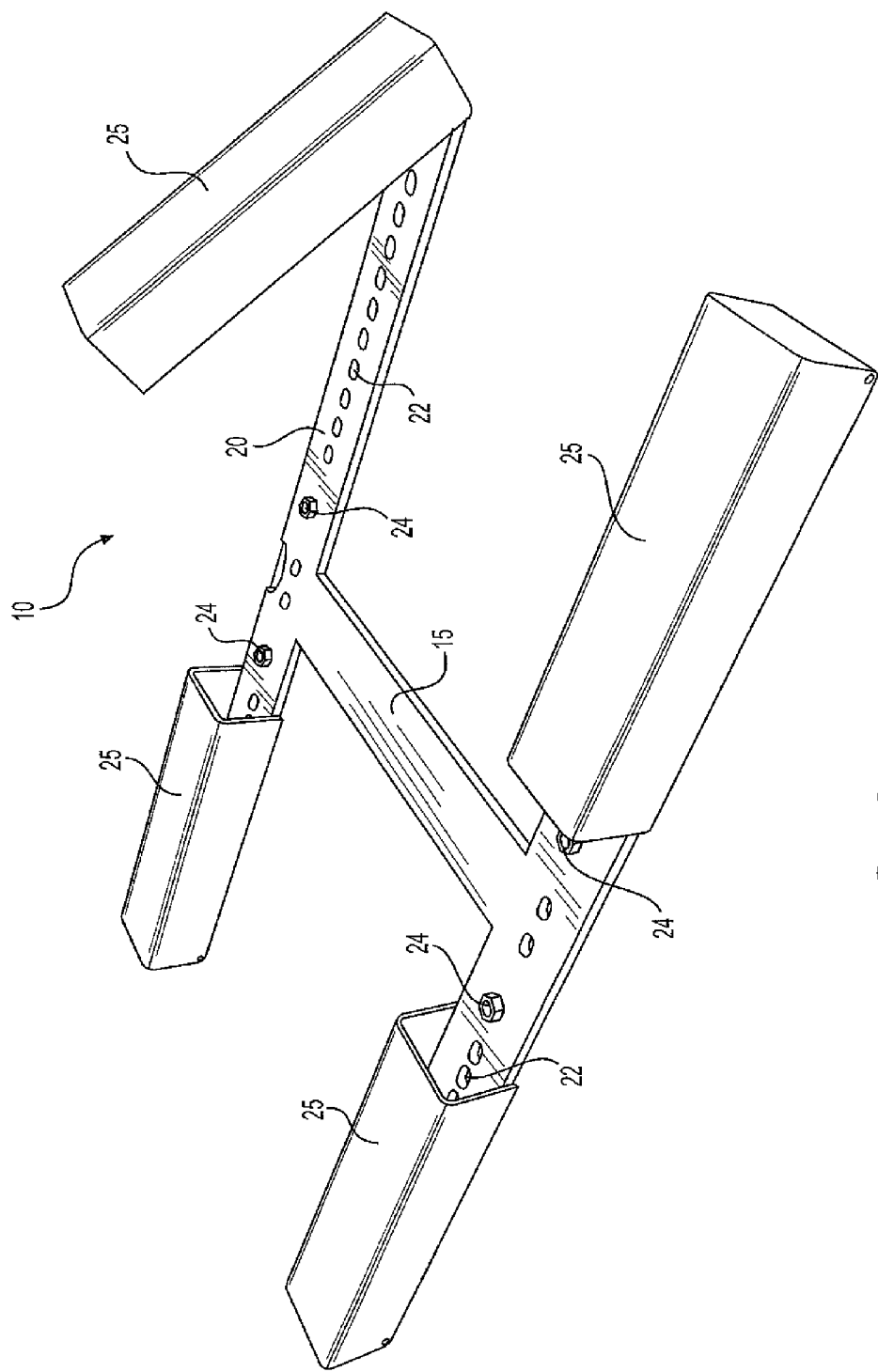
FIG. 3 is a perspective view of the wall rack with three of the security covers closed and the fourth partially open. Note the security covers pivot and close fully making access to the mounting hardware unavailable to normal hand tools and thus totally securing the unit from anybody tampering with the hardware.
Figure 4:
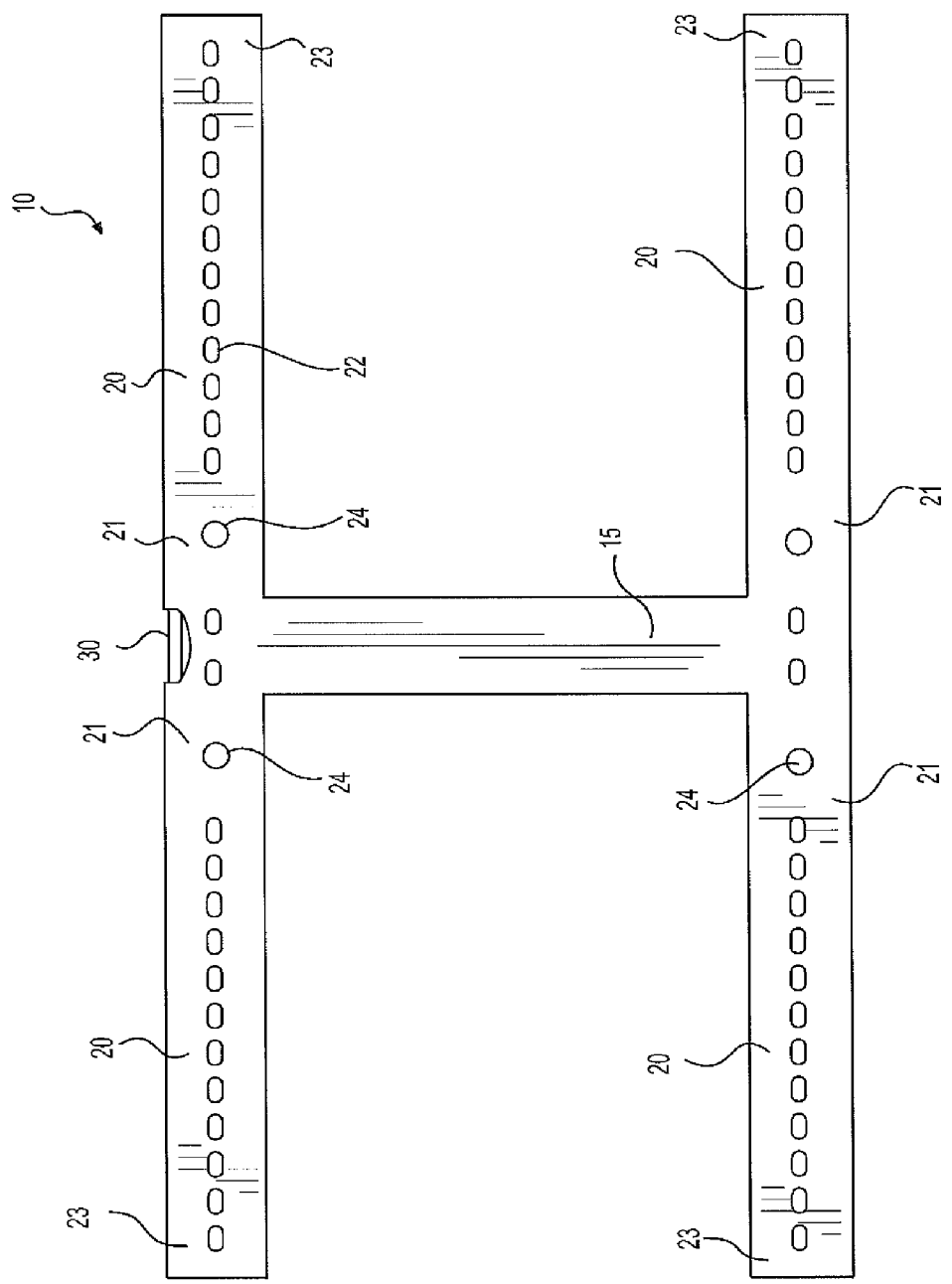
FIG. 4 is a top elevation view of the wall frame alone.

FIGS. 1-4 illustrate one example of a security wall rack in accordance with the present invention. The back bone of the rack is a wall frame 10 having a generally H-shape, four legs 20 plus a cross piece middle section 15. Each of the legs is perforated with multiple holes 22 along its lateral length. It is through these holes 22 that screws or other fasteners will secure this wall frame 10 to a wall or other flat surface. The multiple holes 22 along the length of each leg 20 means that the mount can be positioned over different walls or structures that have different stud locations or other secure components for mounting. The frame 10 is also designed with a total width that allows spanning the common 16" or 24" on center of building material used in construction allowing for a more sturdy installation.

The H-shape demonstrated in FIGS. 1-4 is merely an example of the shape of this wall frame 10. It could be more X-shaped or asymmetrically shaped to be adapted for a particular wall or other support structures. Each of the legs 20 of the wall frame 10 has a security cover 25 hingedly attached to it with hinge 27 or other type of pivoting fastener. The covers 25 have a hollow box shape that covers the length of a leg 20 and any fasteners (not shown) that pass through a hole 22 to secure the frame 10 to a wall. The legs 20 have a proximal end 21 attached to or integral with the middle section 15 and a distal end 23 that is on the opposite end of the leg from the proximal end. The hinge 27 is attached to the distal end 23 of the leg 20. When the covers 25 are in the upward or open position as shown for instance in FIG. 1, a person has access to all of the openings on the legs 20 of the wall frame 10 to secure the frame to a wall or other flat surface using a fastener. A bubble level 30 is also incorporated in the wall frame 10 in order to ensure a straight and level mounting of the frame.

The security covers 25 have hinges 27 or pivoting mechanisms at their end that are mounted on the inside of the security cover and the distal end 23 of the legs 20 of the wall frame 10. In this way, when the security cover 25 is hingedly closed, as demonstrated for instance in FIG. 3, then the hinge 27 is not accessible. Similarly, any fastener that is extending through one of the holes 22 in the leg 20 of the wall frame 10 is not accessible.

Figure 9:
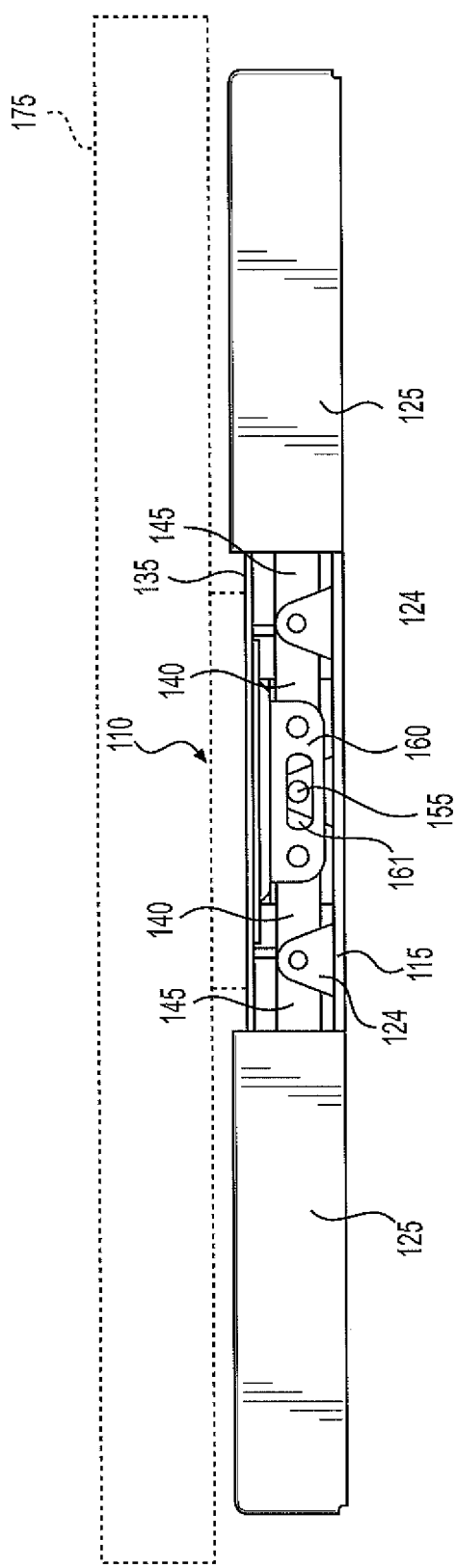
FIG. 9 is a side elevation view of the rack and mount shown in FIG. 7.

When this frame 10 is used in connection with a television mount and a television is fastened to the wall mount and drawn up nested adjacent to the security covers 25 when they are fully in the closed position, a potential thief does not have access to the fasteners that are securing the rack 10 and mount and television to a wall. This is shown in FIG. 9 where a television 175 shown on the mount plate 135 in the retracted position prevents access to fasteners inside the covers.

There are also shown wall mount holes 24 that are threaded holes into which a television mount may be secured. The wall mount holes 24 are positioned at the uncovered proximal end 21 of the legs 20, or they may alternatively be positioned in the middle section 15.

Figure 5:
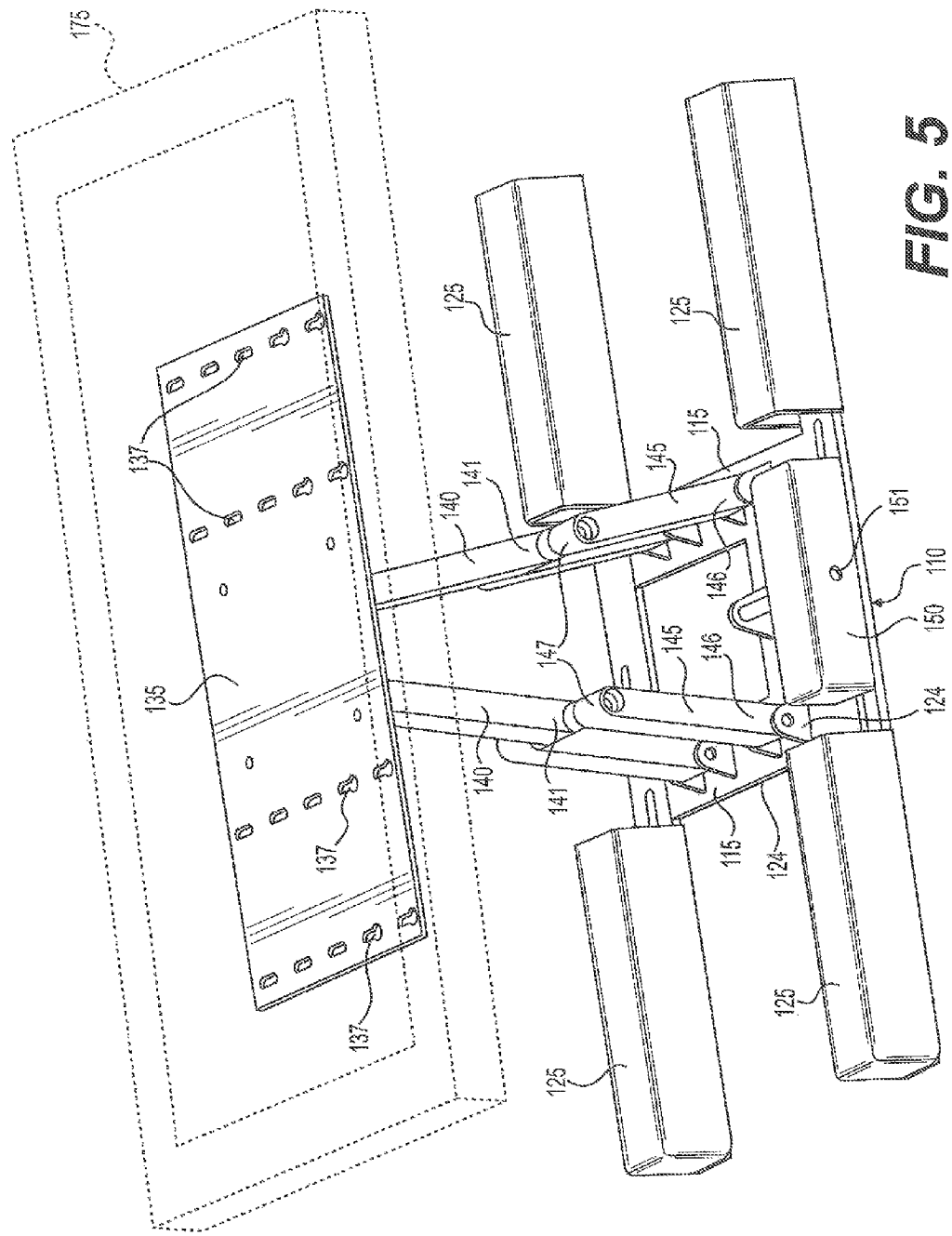
FIG. 5 is a perspective view of a television mount having an alternative wall rack and a mount mechanism attached to the wall mount.
Figure 6:
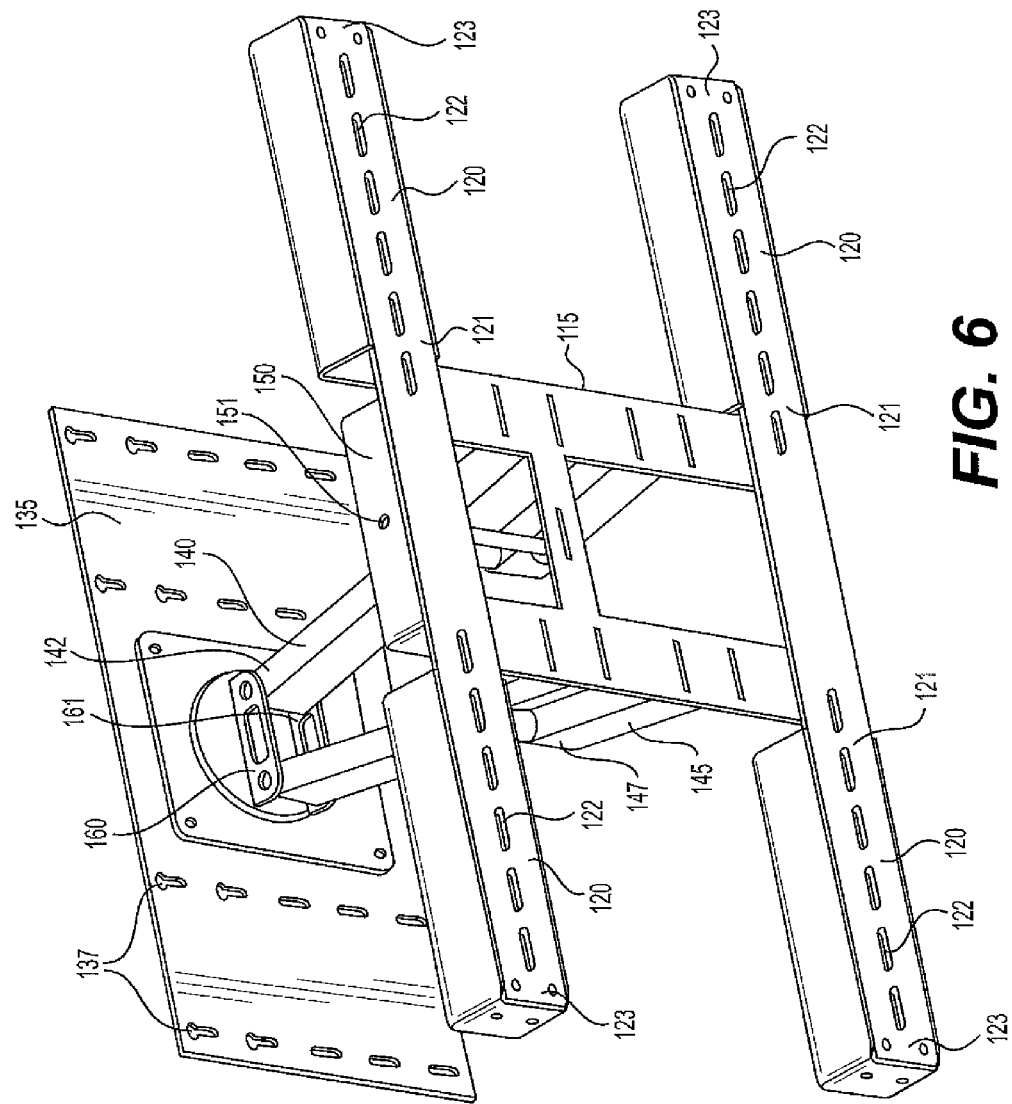
FIG. 6 is a bottom perspective view of the wall mount and rack configuration shown in FIG. 5.

Turning next to FIGS. 5-9, there is illustrated an alternative example of a security wall rack 110 construction that has a television mount 135 fixed onto it and a television 175 on the mount. Beginning with the rack 110, there is shown the four legs 120 with two cross-pieces 115 that form the middle section. Attached to these cross-pieces 115 are flanges 124 in which are rotatably mounted to the bottom end 146 of lower arm supports 145. These lower arm supports 145 are rotatably connected to the cross-pieces 115. On the opposite end 147 of the lower arm supports 145 there are rotatably connected to the bottom end 141 of the upper arm supports 140, that are then connected on their opposite end 142 to the mount plate 135 onto which a television is supported. FIGS. 5 and 6 demonstrate the upper and lower arm supports 140 and 145 in the extended and open position. As especially shown in FIG. 8, the lower and upper arm supports 140 and 145 are in the rotated and closed position. The back of the mount plate 135 includes extension flanges 160. Those flanges 160 are rotatably connected to the upper arm supports 140. Those extension flanges 160 also include slots 161 along their length.

Figure 7:
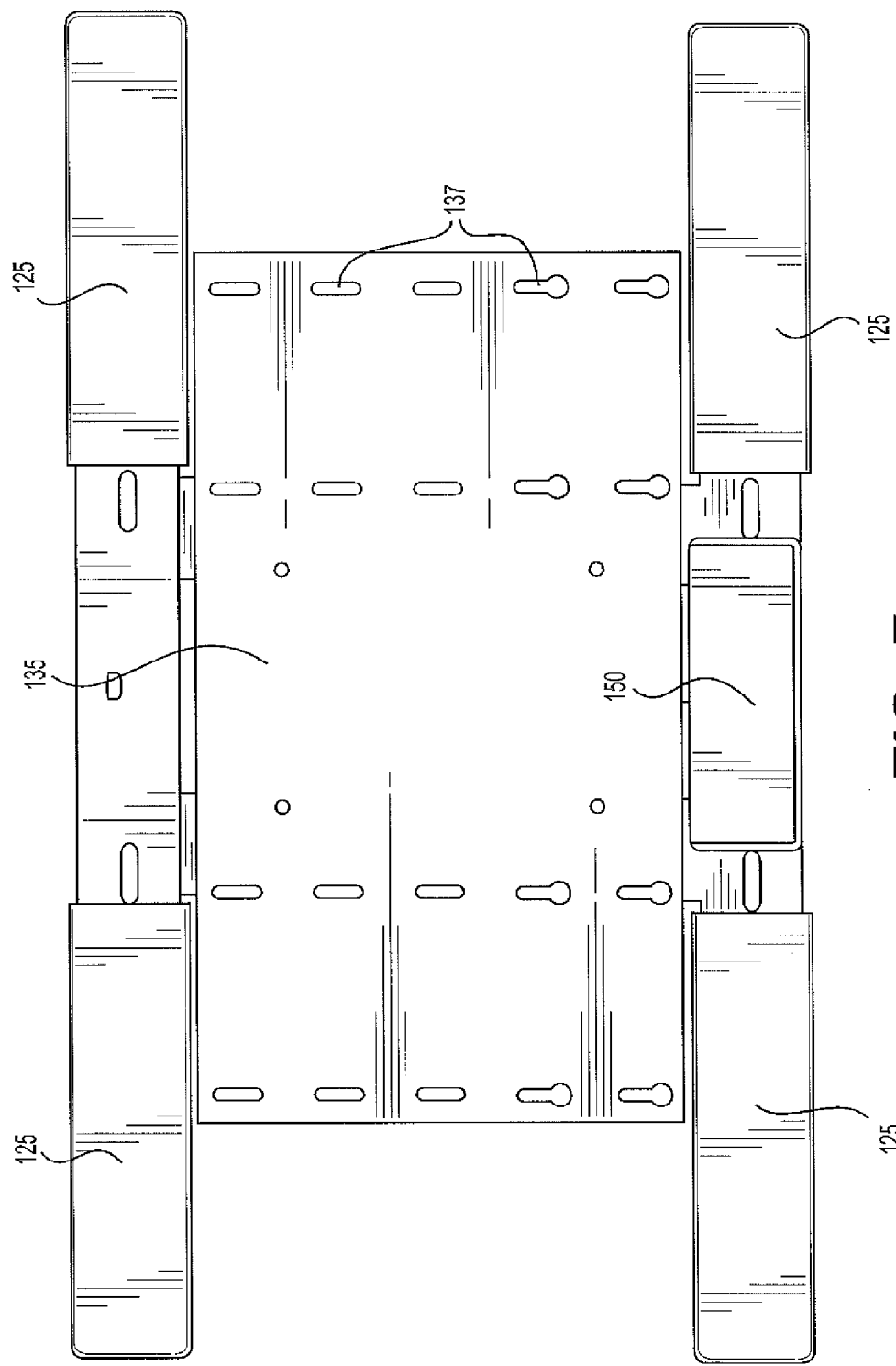
FIG. 7 is a top elevation view of the wall rack and television mount of FIG. 5 rotated into the closed or nested position.
Figure 8:
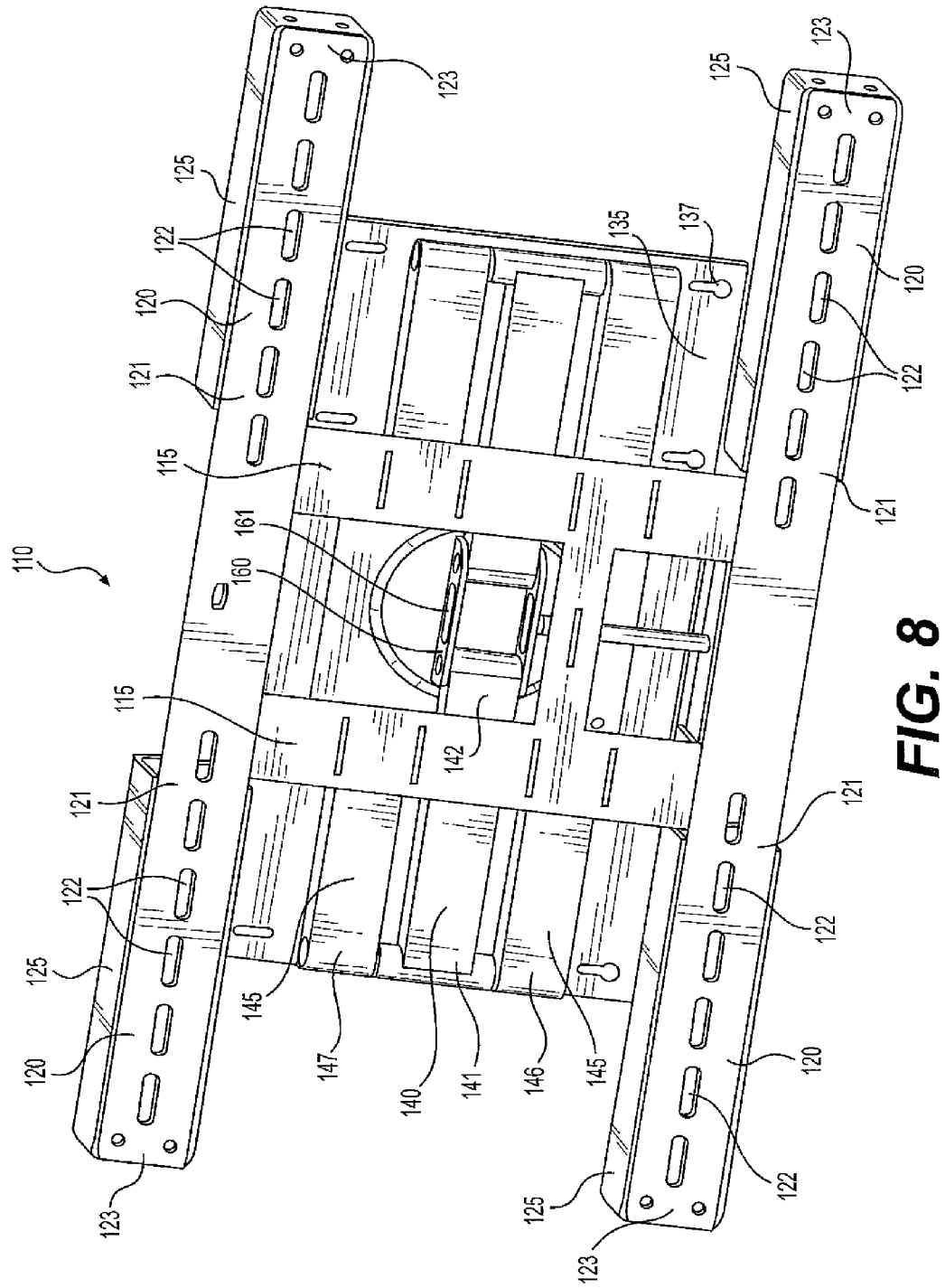
FIG. 8 is a bottom view of the wall rack and mount shown in FIG. 7.

The security rack 110 includes a security hood 150 in the middle section 115 of one side of the security wall rack. The security hood 150 includes a single aperture 151 and has a key pin 155 behind and covered by the security hood 150. The key pin 155 is able to be extended into one or both of the lock slots 161 of the extension flanges 160 on the back of the mount plate 135 when the plate is in the position nested and tight against the adjacent rack as shown in FIGS. 7 and 8. The security hood 150 includes a key hole 151 and security system as described in U.S. patent application Ser. No. 12/606,388, entitled, SECURITY MOUNT, filed Oct. 27, 2009 which is incorporated herein by reference in its entirety. The TV mount described in this co pending application may also be used in connection with a rack construction as illustrated herein, for instance, in FIGS. 1-4 or alternatively, as shown in FIGS. 5-10 in another example.

In one example, the key pin is threadably mounted in a cylinder that is secured to the middle section of a security wall rack. In order to turn the key pin so that it is advanced forward and inserted into the slot to lock the mounting plate in a retracted position, a modified internal drive wrench is used. With the aperture on the security hood having the shape that is the same shape as the outside perimeter of an internal drive wrench such as, for example, a hex wrench used to drive an Allen screw, that conventional internal drive wrench cannot be turned. Accordingly, it is necessary that the modified wrench have a reduced area portion as described in the earlier application above that allows the internal drive wrench to turn the screw key pin and advance the key pin into the locked position. The use of the security hood and shaped aperture may also be used with latches or other hooks that require that they are turned in order to lock a pin into the hack of the mounting plate to lock the mounting plate in the refracted position.

The security features of the wall rack and mount combination enable an easy installation of the rack on a wall or surface. The security covers, for example 25 and 125, are then used to cover access to the screws that secure the rack, for instance 10 or 110, to a surface. As noted earlier, the geometry of the rack may be in other forms that include two legs, three legs, or four or more legs. Alternative embodiments of a four-leg construction are shown in the drawings.

The mechanism that secures the mount plate 135 to the rack 110 is shown with a screw pin mechanism. Of course, other mechanisms could be used to lock a mounting plate in place nested adjacent the rack. Preferably, the mechanism that locks the plate down next to the rack has some security feature to it in order to prevent or deter access to the mounting plate and to the screws that secure this system to a wall. In addition to the screw mechanism used herein, there may also be used latches or springs or similar devices.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A security wall rack and television mount combination comprising:
    a security wall rack comprising a wall frame comprising a plurality of support legs each having a proximal end and a distal end, and a middle section that is connected to the proximal end of each of the support legs;
    wherein the support legs each have multiple holes therethrough and spaced along the length thereof;
    a corresponding plurality of security covers each hingedly connected to only the distal end of the corresponding plurality of support legs;
    wherein the security covers, when in a hinged closed position, are oriented over the holes in the support legs;
    a television mount comprising a mount plate and upper and lower arm supports, wherein the lower arm supports are rotatably connected on one end to the middle section of the wall rack and on their other ends rotatably connected to one end of the upper arm supports, and further wherein the upper arm supports are rotatably connected on their other ends to the mount plate;
    the television mount plate further comprises a locking mechanism positioned on the middle section of one of said plurality of support legs to lock the television mount in a retracted position; and
    wherein the mount plate has an extended position and a retracted position, wherein in the retracted position the upper and lower arm supports and the mount plate are nested adjacent the wall rack and are configured to be locked in place in a nested position.

2. A security wall rack and television mount combination as described in claim 1, wherein locking mechanism of the mount plate includes a flange extending from the back thereof and the flange comprises an aperture therein, and wherein the middle section of the wall rack comprises a pin slidably mounted thereon, with the pin adjacent the mount plate flange aperture and adapted to slide into and out of the aperture, wherein the mount plate is locked in the retracted position when the pin is slidably received in the aperture.

3. A security wall rack and television mount combination as described in claim 2, wherein the locking mechanism further comprises a security hood fixed around and over the pin, and an aperture in the security hood that provides access to the pin.

* * * * *